April 17, 1956    G. V. LACHMANN    2,742,247
OUTER SURFACES FOR CRAFT MOVING IN ONE FLUID
Filed Oct. 26, 1951    3 Sheets-Sheet 1

*Inventor*
GUSTAV V. LACHMANN
By
*Attorney*

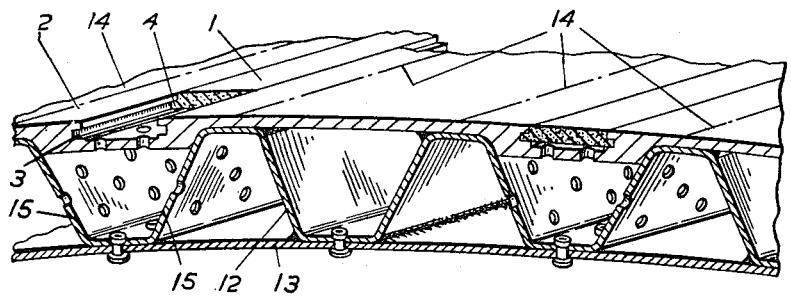
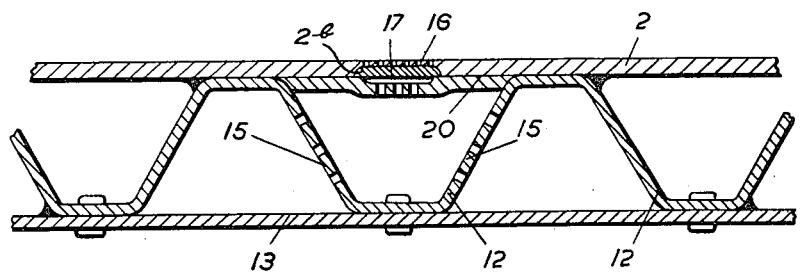
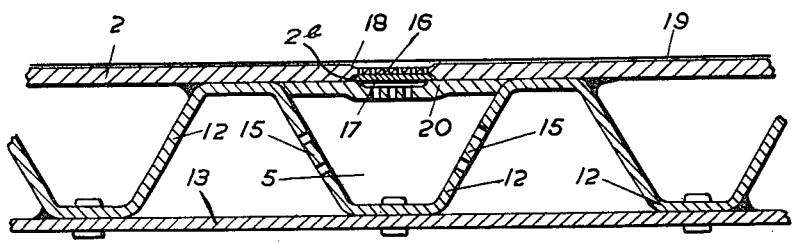

April 17, 1956     G. V. LACHMANN     2,742,247
OUTER SURFACES FOR CRAFT MOVING IN ONE FLUID
Filed Oct. 26, 1951     3 Sheets-Sheet 3
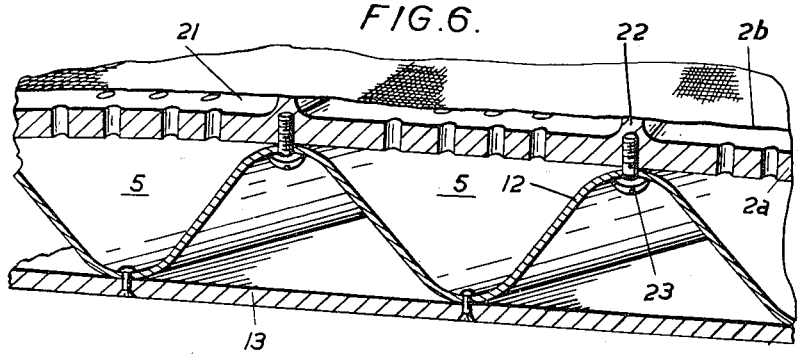
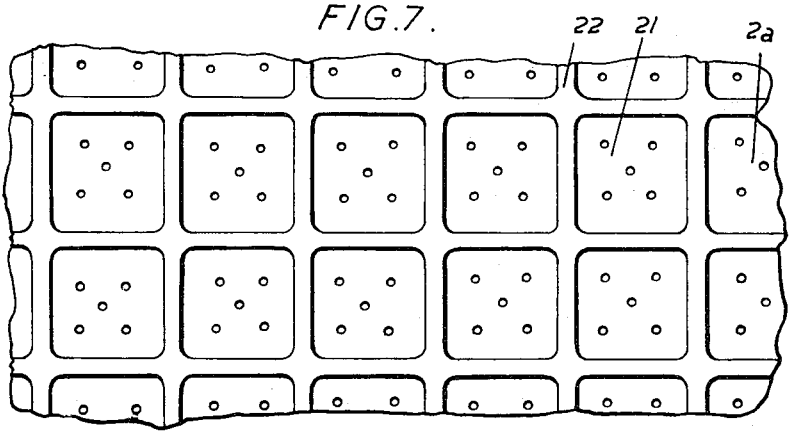
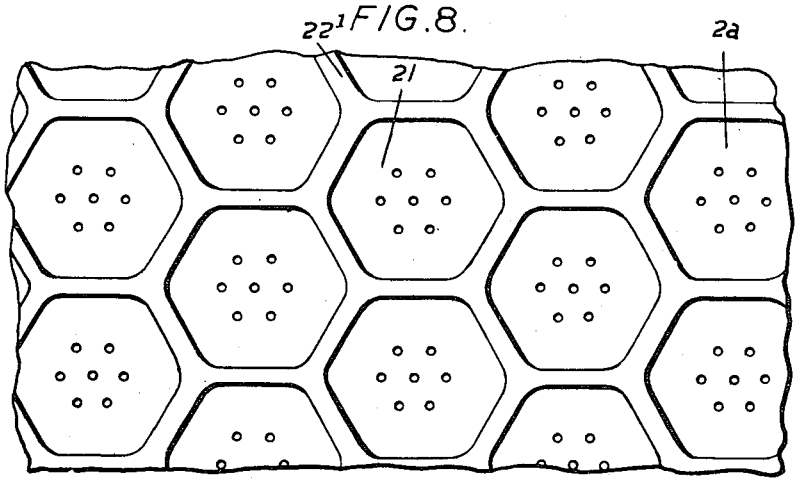
Inventor
GUSTAV V. LACHMANN
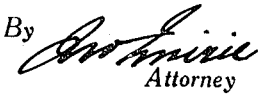
Attorney

United States Patent Office 2,742,247
Patented Apr. 17, 1956

2,742,247

OUTER SURFACES FOR CRAFT MOVING IN ONE FLUID

Gustav Victor Lachmann, Teddington, England, assignor to Handley Page Limited, London, England, a British company Application October 26, 1951, Serial No. 253,240

Claims priority, application Great Britain October 31, 1950

9 Claims. (Cl. 244—130)

This invention relates to outer surfaces for craft moving in one fluid by which is meant the members of the craft comprising a skin with which the surrounding fluid comes into contact e. g. the wing or fuselage of an aircraft.

It is well known that surfaces along which a viscous medium, air or water, flows experience skin friction, that is to say a drag force arising within a thin layer of fluid adjacent to the surface, this layer being known as the boundary layer. Within this layer the flow velocity changes from zero at the surface to the value of the outer unaffected flow. Flow in the boundary layer can be laminar or turbulent, and it has been observed that the skin friction resulting from laminar boundary layer flow is substantially less than that caused by turbulent boundary layer flow. The boundary layer on an aerofoil or body is initially laminar, transition to turbulent flow occurring when a critical Reynolds number is reached. In order to stabilize laminar flow in the boundary layer over substantially the whole skin of a wing, it has been suggested to suck a certain amount of the boundary layer into the interior of the wing. However, previous suggestions for putting this into performance have been directed solely to the provision of a continuous porous skin or the provision of a number of spanwise slits arranged at chord-wise intervals in the skin. The suggestions have been unsatisfactory from a structural point of view because available porous material is not capable of withstanding adequately high stresses and because it is difficult to transmit shear in the skin of a wing or body which is interrupted by continuous slits. Again, if slits are provided they have to be very narrow in width (e. g. .02"–.03") and it is difficult to manufacture surfaces with small slits in view of the impracticable manufacturing tolerances.

From an aerodynamic or hydrodynamic point of view it is unsatisfactory to suck the boundary layer through a continuous porous surface directly into a single common duct such as is in effect formed by an undivided interior of a wing or body since outflow will occur if at any part the suction is insufficient and the static pressure inside the wing or inside the common duct is higher than the minimum static pressure on the outside surface of the aerofoil or body. Alternatively, if the suction inside the wing is too great, too much boundary layer may be removed from parts of the surface where the pressure differential between exterior and interior is greatest. It has been observed that turbulence may be created if the laminar boundary layer is thinned down too much.

It is a main object of this invention to enable the stabilization of the laminar flow in the boundary layer of fluid flowing over the skin of a craft in motion while maintaining the required strength of the outer wall.

According to the present invention, an outer wall for a craft moving in one fluid comprises, a skin, whereof areas running transversely to the direction of fluid flow over the skin during forward motion of the craft are porous to said fluid, and, ducts for connection to fluid extracting means, said ducts communicating with and bridging the porous areas over the length of the areas to act as structural members reinforcing the wall, so that during forward motion of the craft a sufficient amount of the boundary layer of fluid flowing over the skin is removed by suction by said fluid extracting means through said porous areas and ducts to stabilize laminar flow in said boundary layer over substantially the whole skin area.

The porous areas may comprise strips of porous material inserted into the skin in span-wise or peripheral direction so as to form part of the said skin, said strips being placed in chord-wise or axial direction at sufficiently short intervals so that when suction is applied through the strips, conditions are engendered tending to prevent the boundary layer in becoming turbulent.

Further, the strips of porous material may be inserted into recesses or slots in thickened portions of the skin so that said strips are substantially unstressed and spaced away from the bottom of the recesses, the portion of the skin immediately beneath the strips being perforated.

Alternatively, the porous areas may comprise sets of rows of span-wise or peripheral fine and closely-placed perforations in the skin, said sets being spaced in chord-wise or axial direction at sufficiently short intervals so that when suction is applied through the perforations, conditions are engendered tending to prevent the boundary layer becoming turbulent.

In order that the invention may be clearly understood embodiments thereof will now be described by way of example with reference to the accompanying diagrammatic drawings in which:

Fig. 3 is a perspective view of part of a modified form of wing cut chord-wise and seen from above.

Fig. 4 is a chord-wise section of part of another modified form of wing.

Fig. 5 is a chord-wise section of a further modified form of wing.

Fig. 6 is a perspective view of part of yet another modified form of wing cut chord-wise and seen from above.

Fig. 7 is a plan of part of an inner layer of the skin of the wing shown in Fig. 6, and Fig. 8 is a plan of a modified form of inner layer of the skin of a wing.

Figs. 1, 3, 4, 5 and 6 show only a small part of the skin forming the upper outer surface of the wing, illustrating a porous area (areas in Fig. 2) of the skin and associated members. The lower outer surface of the wing is omitted.

In the drawings the same reference numerals denote like or corresponding parts.

Figure 1:
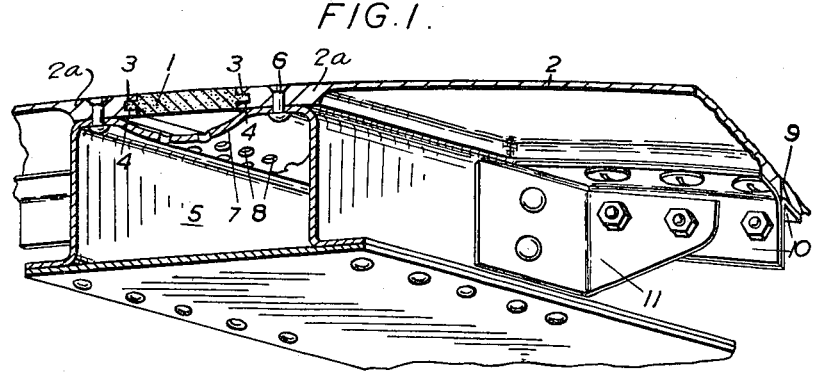
Fig. 1 is a perspective view of a part of an aircraft wing wall cut chord-wise and seen from inside the wing.

In all the constructions shown in the drawings a cross-section of a part of a wall of an aircraft wing is shown, such wall having an outer skin 2, an inner skin 13 and structural members connecting the skins 2, 13 together and forming with one of the skins a number of ducts 5 disposed transversely to the direction of forward travel of the craft in flight, the ducts 5 being connected to a discharge duct to the other end of which a suction pump P (Figure 2) is connected; each duct 5 is in communication with the boundary layer of the air enveloping the craft in flight through passages the outer ends of which are covered by porous material to be described having fine closely spaced passages therethrough; thus by the suction created by the pump P air from the boundary layer is sucked through the fine passages in the porous material and the passages leading to the ducts 5 into the ducts 5, such suction being therefore applied in strips, transversely to the direction of forward flight of the craft in flight, which strips cover a sufficient area of the wing surface to ensure that the amount of air removed from the boundary layer will stabilize the laminar flow therein.

Figure 2:
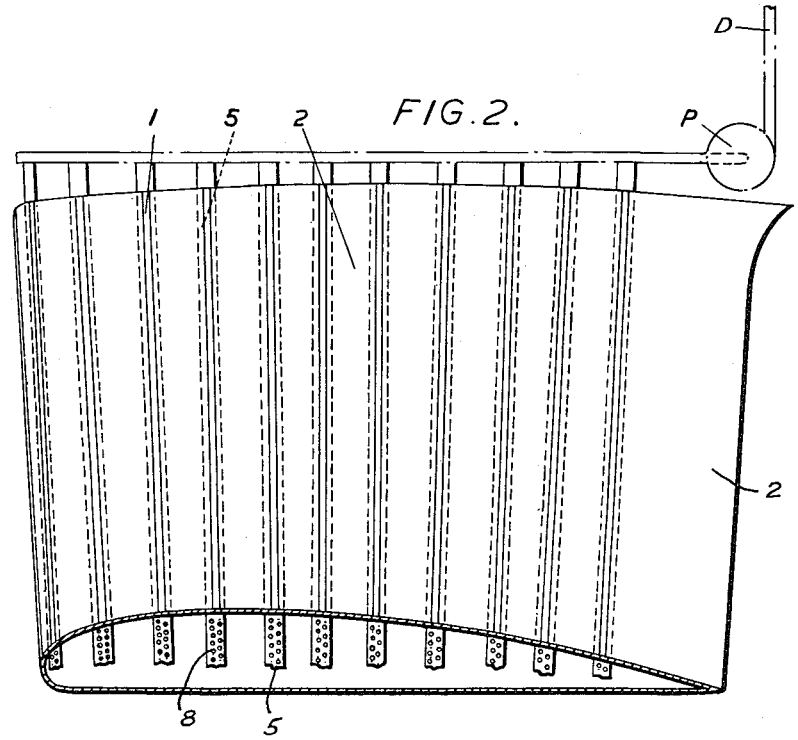
Fig. 2 is a perspective view from above of part of a wing shown projecting from the fuselage and broken off towards its tip.

Referring to Figs. 1 and 2 of the drawings, strips 1 of porous material, for example, sintered bronze, rolled gauze or perforated material are inserted into span-wise slots in the skin 2 of the wing so as to form part of the skin, and extend from root to tip. The skin 2 is formed with thickened portions 2a in the region of the slots. The strips 1 are spaced in chord-wise direction at sufficiently short intervals to prevent flow in the boundary layer of air flowing over the skin 2 from becoming turbulent while flowing across the non-porous part of the skin between strips when subjected to suction. The sides of the slots in the thickened portions 2a are provided with recesses 3. The porous strips 1 have tongues 4 which engage in these recesses and hold the strips in position by a sliding fit.

There is a duct 5 to each strip 1, each duct being secured to the inner surface of the thickened portions 2a of the skin by means of flush-headed rivets 6. The wall 7 of the duct 5 adjacent but spaced away from the skin 2 is coarsely perforated (as at 8) for communication with the strip 1 over its length to enable air to be drawn through the porous strip into the duct. The remaining walls of the ducts are not perforated and are airtight. The duct 5 bridges the strip 1 over its length and acts as a structural member to reinforce the skin structure and makes it possible for the shear flow through the skin 2 to by-pass the strips 1 and leave them substantially unstressed.

The span-wise ducts 5 being structural members and capable of transmitting end loads, act as stringers in the wing, which is built up of the skin 2 with the inserted strips 1 together with the usual ribs and spars. The ducts 5 can be manufactured from drawn or extruded sections and are of a suitably shaped cross-section to fulfill the dual purpose of acting as ducts and structural members.

It is of advantage to provide chord-wise ridges or chord-wise reinforcements where chord-wise joints of skin panels occur, for example, as at 9. The joints are effected by suitably curved chord-wise members 10 of angle section which are attached with one side to the reinforcing ridges, and with the other sides bolted or riveted to each other. These rib-like members are intercostal between the duct members and they are connected to the duct members by brackets 11.

A pump P (see Figure 2) located within the body of the aircraft for example in the fuselage, wings or tailplane and connected to a discharge duct D, is connected to the ducts 5 to provide air extracting means therefor. The suction effect produced along the leading and trailing edge of the wing may be the same, the passages leading to different areas of the wing edges being varied in diameter so that the suction effect of the pump in each area is the same. However, in the particular embodiment being described, that is to say, the wing structure of an aircraft, it may be preferable to vary the amount of suction applied to the boundary layer over different parts of the skin. To this end the connecting passages to the ducts are so arranged and are of such diameters that the pump P provides more suction to the ducts 5 near the trailing edge of a wing than to those near the leading edge, since a greater intensity of suction will be required near the trailing edge.

It will be understood that alternatively a separate pump may be connected to each duct 5, the pumps being of varying extracting capacity to provide greater suction to the ducts near the trailing edge of the wing. As a further alternative strips of varying porosity may be used, those of greatest porosity being near the trailing edge.

Alternatively, a greater number or larger diameter perforations 8 may be provided where greater suction is required.

In order to ensure a uniform span-wise distribution of flow through the strips 1 it is of advantage to grade the degree of porosity or width of strips in such a manner that the resistance against flow through the strips is greatest near the root, i. e. near the pump end, and that there is a decreasing flow resistance or greater porosity or greater width of the strips towards the tips.

In a second embodiment of the invention (see Figure 3), the strips 1 of porous material are inserted into recesses milled into the thickened portions 2a of the skin 2. The strips 1 are spaced chord-wise as described with reference to Figure 1, and are held in position by the engagement of tongues 4 in recesses 3, so as to be spaced away from the bottom of the main recesses. The portion of the skin 2 below each strip 1, forming the bottom of the main recesses, is perforated to enable air to be drawn through the porous strip into the corresponding duct 5.

The ducts 5 in this embodiment are formed by a corrugated sheet member 12 and an inner skin 13 disposed approximately parallel to the skin 2. The corrugated member 12 is spot welded at intervals along the lines 14 to the skin 2, and riveted to the inner skin 13 which forms a part of the wing structure. Each duct 5 is sealed where the duct meets the skin 2, and, in addition, where the duct meets the inner skin 13. The walls 15 of the corrugated member 12 immediately beneath each strip 1 are perforated so that in effect each duct 5 comprises three communicating corrugations to give a large cross-sectional area for air flow in the duct. Each thickened portion of the skin 2 extends the entire width of the corrugation beneath a strip 1, engaging the parts of the walls 15 near the skin 2.

As previously described with reference to Fig. 1, the ducts 5 formed by the corrugated member 2 and the inner skin 13 bridge the strips 1 over their length and act as structural members reinforcing the wing structure.

It will be understood that alternatively the ducts 5 may be formed by corrugated member 12 only, the walls 15 thereof being left without perforations.

In a third embodiment of the invention, illustrated in Figure 4, the strips 1 of porous material are replaced by sets 16 of span-wise rows of fine and closely spaced perforations in the skin 2 which provide porous areas of the skin running in span-wise direction. A portion of the inner side of the skin 2 immediately under each set 16 of perforations is milled out to form a recess 2b and allow a strip 17 of diffusing material to be secured on the inside of the perforated part.

In a further modification (see Figure 5), shallow recessed span-wise grooves 18 are formed in addition in the outer skin 2, the sets 16 of fine perforations lying at the bottom of the grooves 18, and a thin sheet 19, of porous material, is stretched across the whole wing to form a smooth outer surface. As described with reference to Figure 3 the ducts 5 are formed by the corrugated sheet member 12 and the inner skin 13, the walls 15 of the corrugated member beneath the sets 16 of perforations being perforated, and the ducts sealed in an airtight manner. In place of a thickened portion of the skin there is provided a span-wise strip 20 spot welded or riveted to the skin 2 at intervals. This strip 20 is spaced away from the diffusing material and perforated, and its sides abut the parts of the walls 15 of the corrugated member 12 as previously described in connection with Figure 3.

In a fourth embodiment of the invention (Figures 6–8) the skin comprises an inner layer 2a having perforated recessed areas 21 separated by ridges 22, and a continuous substantially unstressed outer layer 2b made from a porous material. The ridges 22 are formed by milling the inner layer 2a from a metal sheet, or alternately the ridges may be made from ribs attached to the inner layer 2a. The ridges 22 may run span-wise and chord-wise as in Figure 7 so that the recessed areas 21 are rectangular, or may be formed so that the recessed areas are polygonal, as in Figure 8. The ducts are formed by a corrugated sheet member 12, the corrugations of which constitute ducts 5 and are disposed in span-wise direction. The member 12 is secured to the inner layer 2a of the skin under the ridges 22, by means, for example, of screws 23. An inner skin 13 is secured to the member 12 as described with reference to Figure 3.

Fluid flow takes place over the outer layer 2b of the outer skin, and the porous outer layer 2b and the perforated recessed areas 21 of inner layer 2a form porous areas, which, connected by passages 8 to the span-wise ducts 5, run in span-wise direction.

The ducts 5 are, as previously described with reference to Figure 2, connected to air extracting means. In order that the amount of boundary layer removed through the areas should be uniform the intensity of suction provided to the outer layer 2b of the skin can be varied by variation in the number and diameters of the perforations in the recessed areas 21. Also as previously described, the ducts 5 bridge the porous areas over the length of the areas to act as structural members reinforcing the skin structure.

The invention may be applied to aircraft fuselages in which case the porous strips 1 of the first embodiment are shaped according to the fuselage cross-section and the ducts 5 are frame members interconnected with each other by secondary ducts which form longitudinal members. If the skin comprises an inner layer 2a and an outer layer 2b as described with reference to Figures 6–8, the whole skin with the exception of the ribs 20 being porous, a corrugated sheet member or individual longitudinal members may form the ducts.

The embodiment of the invention which has just been described with reference to the drawings may be modified without departing from the invention as defined in the appending claims as will be well understood by those skilled in the art, e. g. instead of connecting the ducts 5 for each strip 1 by headed rivets, these elements may be connected together by spot-welding or by bonding the elements together by continuous welding. Similarly the corrugated sheet member 12 which is employed to form the ducts 5 may be spot-welded or riveted or otherwise rendered integral with the skin 2. Moreover, the amount of suction to be applied to the boundary layer may be varied over different parts of the skin. For example, the leading and trailing edges of aircraft wings may be served by separate pumps which are of different capacity, or a series of pumps of similar capacity may be employed and the speed of the respective pumps varied according to the different conditions desired to be engendered. Alternatively, the porous areas employed in constructions according to the invention may be of varying density so that the degree of porosity of the material at different portions of the skin varies. The same result can be obtained by varying the sizes (or number) of the perforations through the skin which are provided to constitute the desired porous areas. It is also clear that the suction may be varied by varying the size of ducting leading to different areas and supplied by the same pump.

I claim:

1. Craft designed to be driven through an enveloping fluid comprising an outer skin over which turbulence is liable to occur during forward movement of the craft, said outer skin being formed with perforated areas therein extending transversely to the direction of forward movement of the craft and with recesses on the inner surface of the outer skin below said perforated areas, porous elements located in said recesses, transverse reinforcing members secured to the inner surface of the outer skin in the vicinity of the porous elements, recessed and spaced from the porous elements and perforated, a load-carrying corrugated sheet member secured to the outer skin and defining transverse ducts having an outer wall formed by the reinforcing members, suction means connected to the transverse ducts for producing a pressure differential across the porous elements, to engender a flow of the enveloping fluid through the porous elements and a discharge duct for the fluid leading away from the porous elements and connected to said suction means.

2. Craft according to claim 1, wherein the outer skin is recessed on its outer surface along the perforated areas thereof and a smooth skin of porous material is stretched over the outer skin.

3. Craft according to claim 2, comprising an inner skin secured to the corrugations of the load-carrying corrugated member, the webs of the corrugated member adjacent the porous elements being perforated to provide communication between adjacent corrugations thereof.

4. Craft according to claim 1, comprising an inner skin secured to the corrugations of the load-carrying corrugated member, the webs of the corrugated member adjacent the porous elements being perforated to provide communication between adjacent corrugations thereof.

5. An outer wall for aircraft designed to be driven through an enveloping fluid, comprising spaced inner and outer skins, a load-carrying corrugated member disposed between said skins with the corrugations thereof extending transversely to the direction of forward movement of the craft, means securing the alternate peaks and valleys of the corrugated member to the opposed surfaces of the outer and inner skins respectively with adjacent webs of the corrugated member together with transversely extending portions of the outer skin defining ducts therebetween, said transversely extending portions of the outer skin being perforate throughout, suction means connected with said ducts for creating a pressure differential through said perforate portions, and porous means spanning the perforate portions of said outer skin.

6. The structure defined in and by claim 5, wherein said transversely extending portions of the outer skin are thickened on the inner side thereof, each of said transversely extending portions also having a slot therein on the outer surface of the skin and said porous means being removably received in said slots.

7. The structure defined in and by claim 5, wherein said outer skin is recessed on its inner surface throughout each of said transversely extending portions, said porous means being received in such recesses, and transverse reinforcing members secured to the inner surface of said outer skin throughout said transversely extending perforate portions and serving to retain said porous means in place, said reinforcing members being perforate in the areas thereof immediately below said porous means.

8. The structure defined in and by claim 7, wherein a smooth layer of porous material is stretched over said outer skin.

9. The structure defined in and by claim 5, wherein the outer surface of said outer skin is provided with a plurality of ridges and a layer of porous material stretched over said ridges and held in spaced relation to the outer surface of the outer skin thereby.

References Cited in the file of this patent

UNITED STATES PATENTS

| | | |
|---|---|---|
| 1,332,930 | Steinmetz | Mar. 9, 1920 |
| 1,767,944 | Schleusner | June 24, 1930 |
| 1,808,842 | Fedor | June 9, 1931 |
| 1,842,736 | Stout | Jan. 26, 1932 |

(Other references on following page)

UNITED STATES PATENTS

| | | |
|---|---|---|
| 2,211,871 | Wagner et al. | Aug. 20, 1940 |
| 2,230,393 | Thomson | Feb. 4, 1941 |
| 2,609,068 | Pajak | Sept. 2, 1952 |
| 2,613,893 | Young | Oct. 14, 1952 |
| 2,643,832 | Thwaites | June 30, 1953 |

FOREIGN PATENTS

| | | |
|---|---|---|
| 484,405 | Great Britain | May 2, 1938 |
| 511,650 | Great Britain | Aug. 22, 1939 |
| 558,313 | Great Britain | Dec. 30, 1943 |

OTHER REFERENCES

Journal of the Aeronautical Sciences (pp. 106 and 107), February 1947.

NACA Technical Note No. 1741 (P. 11), November 1948.

NACA Technical Memorandums No. 974 (Fig. 2), April 1941.